April 25, 1950  R. KRAH ET AL  2,504,987
PIN SETTING MACHINE AND METHOD
Filed April 10, 1947  6 Sheets-Sheet 1

April 25, 1950 R. KRAH ET AL 2,504,987
PIN SETTING MACHINE AND METHOD
Filed April 10, 1947 6 Sheets-Sheet 2

INVENTORS.
Rudolf Krah
Walter W. Block
By:- Moore, Olson & Trexler attys.

April 25, 1950

R. KRAH ET AL 2,504,987

PIN SETTING MACHINE AND METHOD

Filed April 10, 1947

INVENTORS
Rudolf Krah
Walter W. Block
By:- Moore, Olson & Trexler
attys

April 25, 1950 R. KRAH ET AL 2,504,987
PIN SETTING MACHINE AND METHOD
Filed April 10, 1947 6 Sheets-Sheet 6

Patented Apr. 25, 1950

2,504,987

UNITED STATES PATENT OFFICE 2,504,987

PIN SETTING MACHINE AND METHOD

Rudolf Krah and Walter W. Block, Kenosha, Wis.

Application April 10, 1947, Serial No. 740,614

17 Claims. (Cl. 1—1)

This invention relates to the manufacture of articles such as curtain stretchers, and it is particularly concerned with the insertion of pins in the frame members or moldings that are used in the construction of curtain stretchers and the like.

An object of the invention is to provide an improved pin setting machine which, in a single operation, cuts a pin from a length of wire and drives the same into a curtain stretcher molding or other pierceable member.

A further object is to provide an improved machine for cutting pins repeatedly from the wire and affixing them in an aligned row on the molding.

A still further object is to provide an improved machine for affixing pins to the molding by driving an anchor portion of each pin into the molding from the obverse or curtain-engaging face thereof.

A still further object is to provide a novel method of setting pins in a pierceable member, which method includes embedding the free end of a length of wire in the member, cutting a pin from the wire after the end thereof has thus been embedded, forming the fabric-impaling outer end of the embedded pin simultaneously with the root or anchor portion of the next pin, advancing the pierceable member a step relative to the pin setting station, and then repeating the procedure just described.

A still further object is to provide various other improvements and novel features in pin setting machines as will be pointed out in the following description taken in connection with the accompanying drawings, wherein:

Figures 1, 2, 3:
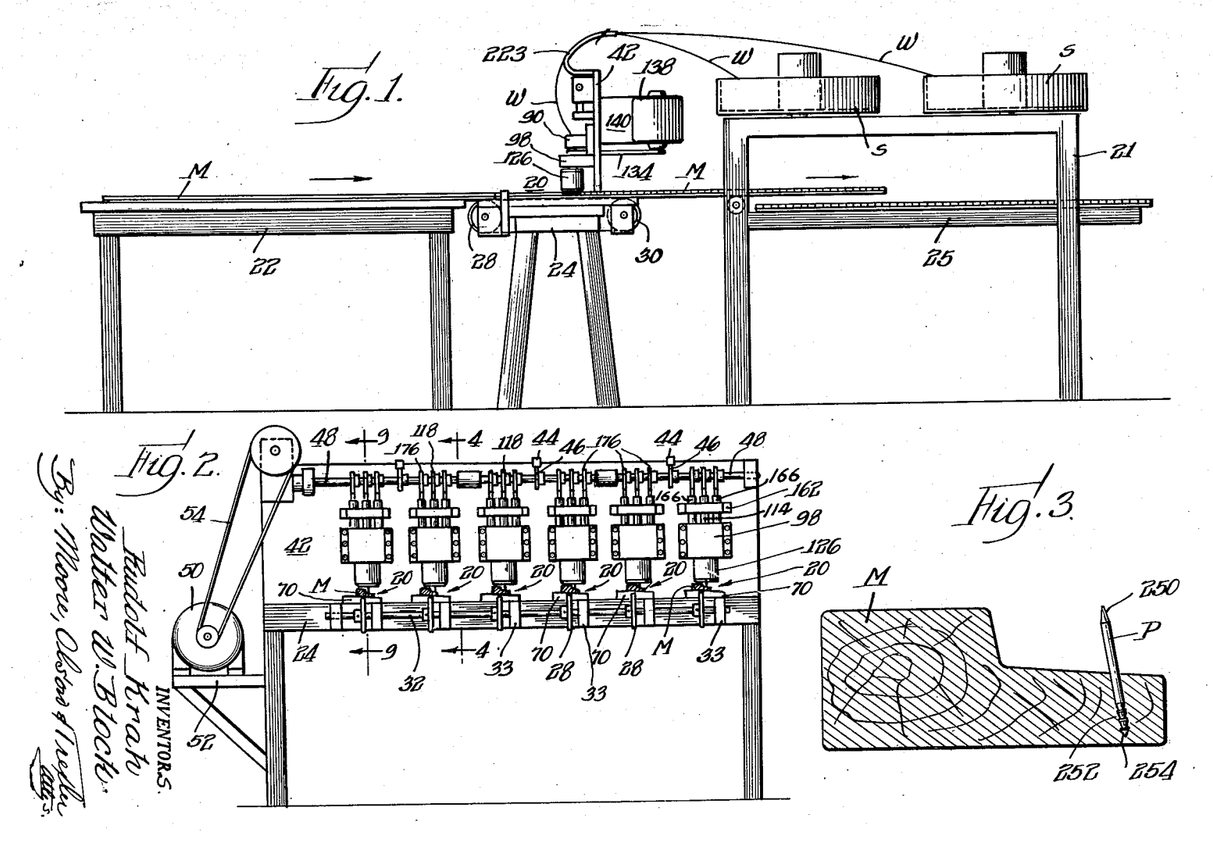
Fig. 1 is a side elevation of a pin setting machine constructed in accordance with and embodying the principles of the invention.
Fig. 2 is a front elevation of the machine.
Fig. 3 is a sectional view taken transversely of a curtain stretcher frame member or molding showing a pin inserted therein by the machine.
Figures 9, 10:
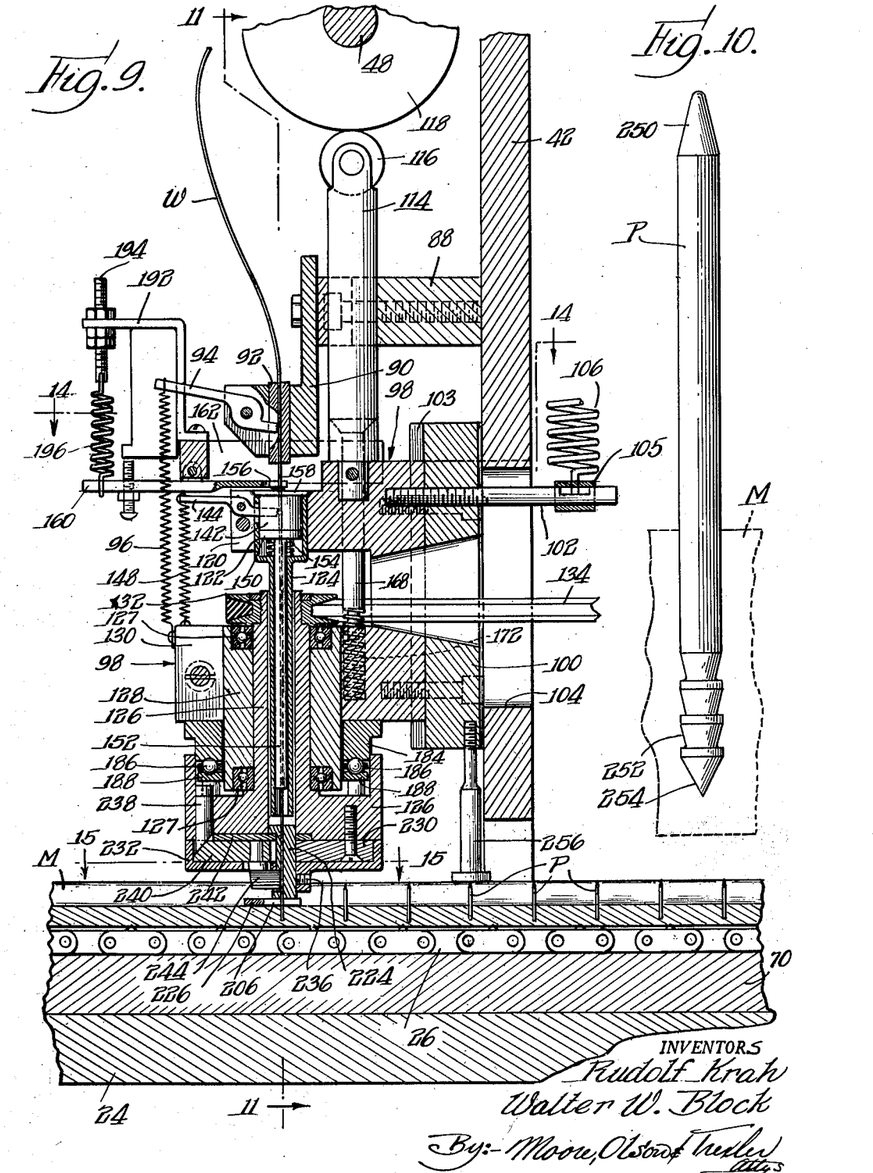
Fig. 9 is a vertical section on the line 9—9 in Fig. 2.
Fig. 10 is an enlarged elevational view of a pin formed by the machine, indicating the manner in which the pin is embedded in a molding.

Referring to Figs. 1 and 2, the illustrated form of my invention comprises a machine capable of handling six moldings at a time in the pin setting operations. The moldings are passed respectively through pin setting stations 20, at each of which the pins are inserted successively in a molding as the latter is advanced longitudinally step by step through the station. Individual moldings are fed in close succession through each of the stations, being properly timed in their advance through the station so that the pins are inserted at predetermined spaced locations thereon. The pins are formed from wire W which is supplied to the pin forming and setting devices at the stations 20 from supply spools S, Fig. 1, supported on a stand 21, there being one such supply spool for each of the stations 20 that are being utilized. The pins P preferably are shaped as indicated in Fig. 10 and are anchored in the molding M as shown in Fig. 3.

The moldings M are advanced across a table 22, Fig. 1, to the pin setting stations 20 disposed above a supporting stand 24. Feeding means, illustrated particularly in Figs. 4 and 5, cause the moldings M to move longitudinally step by step through the respective pin setting stations 20. From the pin setting stations the moldings M are delivered to a table 25 on the stand 21.

Figures 4, 5:
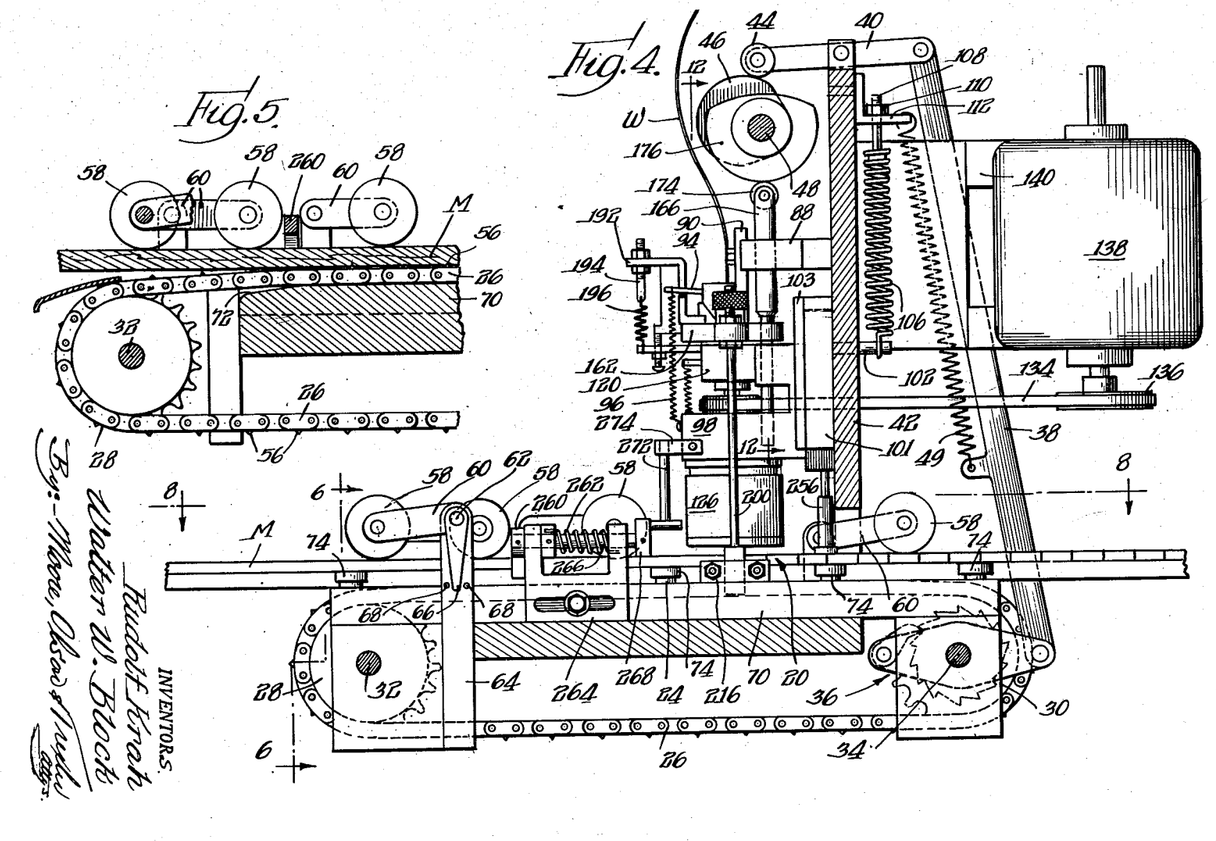
Fig. 4 is a longitudinal section through the machine taken on the line 4—4 in Fig. 2 and showing, in side elevation, the apparatus at a pin setting station in the machine.
Fig. 5 is a fragmentary longitudinal section through the feeding means for conveying the curtain stretcher moldings through a pin setting station.
Figure 6:
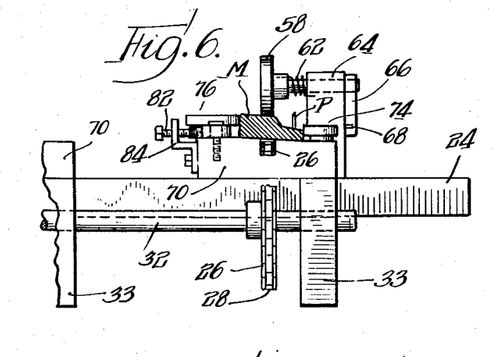
Fig. 6 is a transverse section through the feeding means taken on the line 6—6 in Fig. 4.

Aligned with each station 20 is a feed chain 26, Figs. 4, 5 and 6. The various chains 26 are meshed with sprockets 28 and 30 at the front and rear ends of the stand 24, respectively. The sprockets 28 are mounted on a shaft 32 extending across the front edge of the stand 24, this shaft being journaled in bearings 33, Fig. 2. The rear sprockets 30 are mounted on a shaft 34 and are connected by pawl-and-ratchet mechanisms generally designated 36, Fig. 4, to reciprocatory links 38. The links 38 are connected to levers 40 pivotally supported on a stationary wall 42 extending upwardly from the supporting stand 24. The levers 40 carry cam followers 44 that cooperate with cams 46 mounted on a cam shaft 48, Figs. 2 and 5, journaled in bearings on the wall 42. Springs 49 acting upon the links 38 urge the followers 44 against the cams 46. A motor 50, mounted on a bracket 52 carried by the stand 24, is connected by a belt 54 and suitable gearing to the cam shaft 48 for driving the same.

As the cam shaft 48 is rotated, the cams 46 acting on the cam followers 44 cause the links 38 to be reciprocated, and through the medium of the pawl-and-ratchet mechanism 36 this action is effective to impart step by step movement to the feed chains 26. Each of the chains 26 carries small spurs 56 which are adapted to penetrate and to grip the underside of the molding M as shown, for example, in Fig. 5. The upper face of the molding M is engaged by rollers 58, Figs. 4, 5, 6 and 8, which are capable of only limited movement vertically so as to press the molding M against the upper pass of the feed chain 26. Each roller 58 is journaled in an arm 60 secured to a stub shaft 62 that is journaled in a bracket 64. A rocker arm 66 fast on each stub shaft 62 extends between a pair of spaced pins 68 on the adjacent bracket 64. One of the pins 68 serves to limit upward movement of the roller 58 when a molding M is in contact therewith, while the other pin 68 limits downward movement of the roller 58 when a molding M has moved out of engagement therewith.

Each molding M is moved along a stationary bed 70 on the stand 24. As shown in Figs. 5 and 6, each of the beds 70 has a longitudinal groove therein to receive the upper pass of the feed chain 26. The leading end of this groove is flared downwardly as indicated at 72, Fig. 5, so that the spurs 56 on the chain 26 are gradually urged against and into the material of the molding M as the chain 26 enters the groove. Moldings M are advanced successively in a longitudinal, step by step movement through each pin setting station by one of the intermittently operated feed chains 26. Guide rollers 74 rotatable about vertically extending stub shafts fixed to the bed 70 engage one of the longitudinal edges of each molding M as it passes through the work station. The other longitudinal edge of the molding is engaged by guide rollers 76, each of which is journaled on an arm 78 pivotally connected to the bed 70. A leaf spring 80 secured to each arm 78 bears against the end of a screw 82 threaded in a small bracket 84 on the bed 70. The amount of spring pressure applied to each roller 76 may be adjusted by means of its screw 82.

Figures 14, 15, 16, 17, 18, 19:
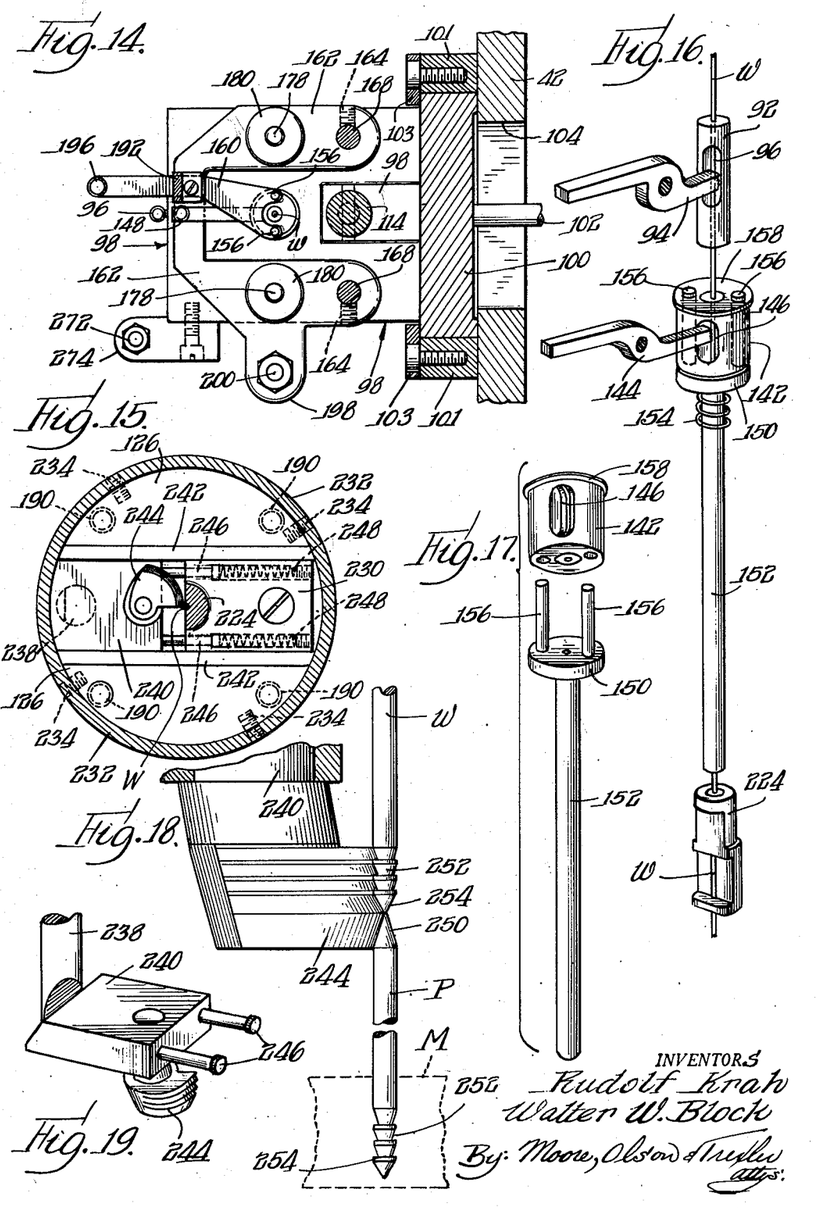
Fig. 14 is a horizontal section on the line 14—14 in Fig. 9.
Fig. 15 is a horizontal section looking from below on the line 15—15 in Fig. 9.
Fig. 16 is a perspective view showing certain parts of the wire handling mechanism of a pin setting apparatus.
Fig. 17 is a perspective view showing several parts of the wire handling mechanism in disassembled relation.
Fig. 18 is an elevational view illustrating a pin forming operation.
Fig. 19 is a perspective view of a pin forming member used in the machine.

Referring to Figs. 4, 9, 11 and 12 there is provided at each of the pin setting stations a structure including a stationary portion and several vertically reciprocable portions. The stationary portion is supported by the wall 42, being carried by a bracket 88 from which a leg 90 depends. A bushing 92, Figs. 9 and 16, is press-fitted or otherwise secured in the leg 90 to guide the wire W downwardly into the movable portion of the pin setting apparatus. A pawl or dog 94 pivoted on the leg 90 has a wire gripping jaw which extends through an aperture 96 in the side of the bushing 92 to engage the wire W. A spring 96 extends between the tail of the pawl 94 and a movable head 98 of the pin setting apparatus. The pawl 94 is so arranged that it permits downward movement of the wire W but prevents upward movement thereof.

The head 98 is secured to a block 100 slidably mounted on a vertical face of the wall 42 between guide strips 101, on which retaining strips 103 are secured, Figs. 4 and 14. A pin 102, Figs. 4 and 9, anchored in the block 100 extends rearwardly thereof through an opening 104 in the wall 42. Springs 106 are extended between a strap 105 on the pin 102 and rods 108 that are threaded through nuts 110 supported by a bracket 112 on the rear face of the wall 42. The nuts 110 enable the tension of the springs 106 to be adjusted as desired.

A vertical rod or post 114, Figs. 9, 11, 12 and 14, extends upwardly from the head 98 to which it is secured at its lower end. A cam follower 116 journaled in the upper end of the rod 114 cooperates with a cam 118 on the cam shaft 48. The springs 106 serve to maintain the follower 116 in contact with the cam 118. As the shaft 48 rotates, the cam 118 causes the head 98 to reciprocate vertically in timed relation with the step-by-step movement of the feed chain 26, so that the head 98 descends during intervals when the chain 26 and the molding M carried thereby are at rest, the purpose of this being explained presently.

A boss 120 on the head 98 is split to afford a clamp in which the upper end of a tubular member or sleeve 122 is held. The member 122 has a lower reduced sleeve portion 124 extending downwardly through a central or axial passageway in a spindle 126 carried by the head 98. The spindle 126 is journaled in ball bearings 127 that are mounted in a sleeve or bushing 128 held by a split boss or clamp 130 on the head 98. A pulley 132 is secured on a hub portion of the spindle 126 which projects above the boss 130, the lower face of the pulley 132 resting on the upper bearing 127. A horizontally extending belt 134 is passed around the pulley 132 and the pulley 136 of a motor 138, Fig. 4, carried by a bracket 140 on the rear of the wall 42, the opening 104 in the wall 42 permitting passage of the belt 134. An individual motor 138 is provided for each of the pin setting stations. The belt 134 is sufficiently elastic to permit the vertical reciprocatory movement of the head 98 just described.

Disposed within the sleeve 122 in the boss 120 is a small cylindrical member 142, Figs. 9, 11, 16 and 17, having a central opening therein through which the wire W is passed. A wire feeding pawl 144 is pivoted on the boss 120 and has a wire gripping jaw which extends through an aperture 146 in the cylinder 142 to engage the wire W. A spring 148 is extended between the tail of the pawl 144 and the boss 130 on the head 98.

As the head 98 descends, the pawl 144 bites the wire W and forces the wire downwardly with the head 98. The lower end of the wire W is driven into the molding M during this downward movement of the head 98. It is desirable that the pawl 144 be positively disengaged from the wire W before the head 98 commences its upward movement, so as to prevent any tendency to buckle the wire intermediate the pawls 144 and 94. To this end, the cylindrical member 142 is mounted on a collar 150 from which depends a tube 152 that is slidably fitted within the tube 124. The collar 150 and tube 152 are formed with a central wire passageway therein. A coil spring 154 is interposed between the collar 150 and the neck of the sleeve 122 at the junction of the latter with the tube 124, thereby urging the cylinder 142 upwardly. Two pins 156 anchored in the collar 150 extend upwardly through openings in the cylinder 142 and project through openings in a circular cover plate or disc 158 above the cylinder 142.

Figures 11, 12, 13:
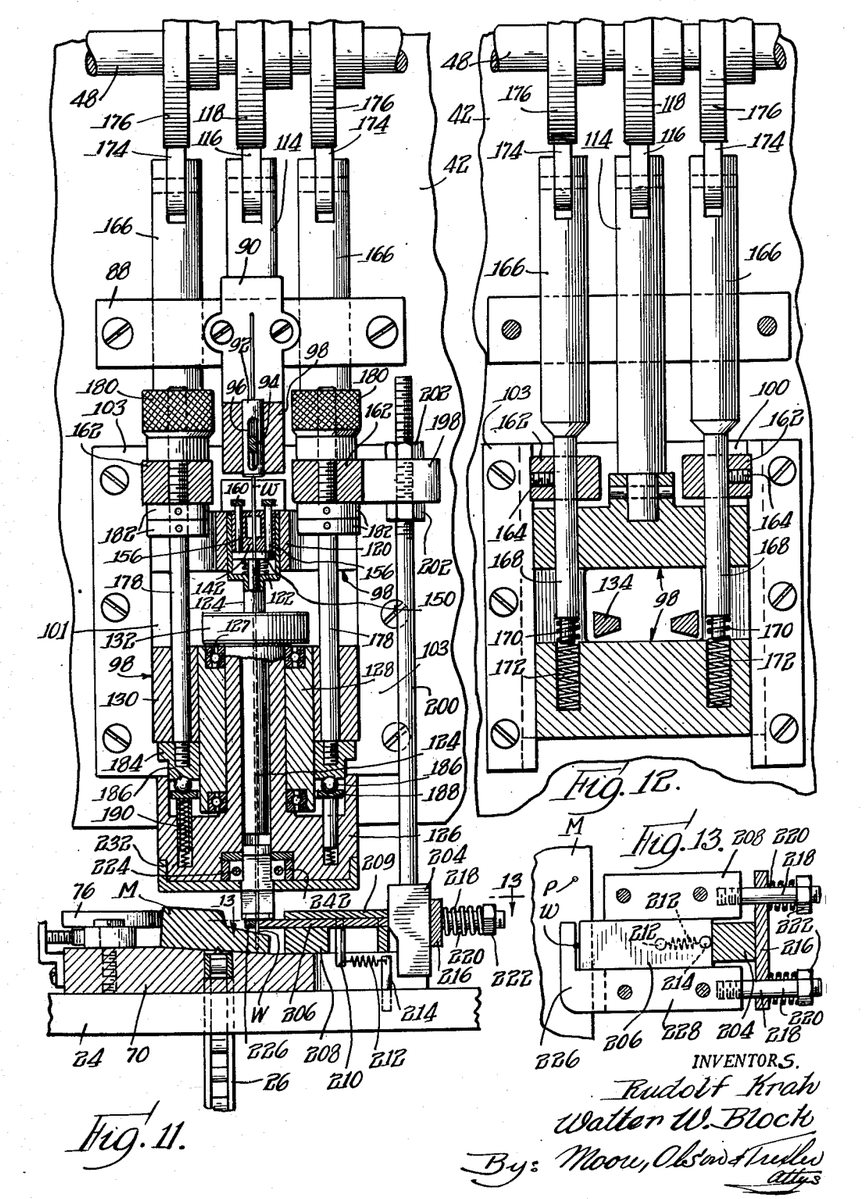
Fig. 11 is a vertical sectional view taken on the line 11—11 in Fig. 9.
Fig. 12 is a vertical section on the line 12—12 in Fig. 4.
Fig. 13 is a horizontal section on the line 13—13 in Fig. 11.

When the wire W has been embedded in the molding M, a yoke 160, Figs. 9, 11 and 14, which is movable relative to the head 98, presses the pins 156 downwardly whereby the cylindrical member 142 is caused to descend a short distance relative to the now stationary wire W. As the upper edge of the aperture 146, Figs. 16 and 17, in the member 142 engages the pawl 144, the latter is tilted sufficiently to disengage the wire gripping end thereof from the wire W. This enables the feed pawl 144 to rise without buckling the wire W.

The yoke 160 is pivotally supported by a horizontally disposed, U-shaped member 162 having legs which straddle the upper portion of the head 98. As shown in Fig. 12, the legs of the member 162 are fastened by set screws 164 to the reduced lower portions 168 of vertically extending posts or rods 166. The rods 168 are slidably fitted in apertures extending through the upper part of the head 98. Coil springs 170 fitted on the lower ends of the rods 168 are received in sockets 172 afforded in the lower portion of the head 98. The upper ends of the rods 166 carry cam followers 174 that cooperate with cams 176 on the shaft 48. The springs 172 serve to urge the followers against the cams 176 and also tend to urge the head 98 downwardly, the latter action being resisted by the springs 106, Figs. 4 and 9, that support the head 98.

Vertical rods 178 threaded at their upper and lower ends are passed through openings in the bifurcated member or yoke 162. Nuts 180 are screwed onto the upper ends of the rods 178, and collars 182 are pinned to these rods below the yoke 162. The rods 178 pass through clearance openings in the lower part of the head 98 and are threaded into tapped openings in a ring 184, Figs. 9 and 11, carried by these rods at their lower ends. An anti-friction device including ball bearings 186 disposed in a raceway between the ring 184 and a ring 188 disposed therebelow is provided for a purpose which will appear presently. The ring 188 is pressed upwardly against the balls 186 by coil springs 190 that are mounted in sockets in the spindle 126.

The bifurcated member 162, Figs. 9, 11 and 14, carries a bracket 192 on which is mounted an adjusting screw 194. A spring 196 is extended between the adjusting screw 194 and the tail of the pivoted yoke 160. The downward motion of the member 162 under the influence of the cams 176 continues relative to the head 98 when the latter has reached the lower limit of its travel, thereby tensioning the spring 196 so that it applies force to the end of the yoke 160 which engages the pins 156. This produces the action described above whereby the feed pawl 144 is disengaged from the wire W.

The member 162 has an ear 198 from which depends a rod 200 that is held in an adjusted position by nuts 202 threaded on this rod. A cam block 204 is carried by the rod 200 at the lower end thereof and cooperates with the rear edge of a slide 206 mounted between a pair of blocks 208 and 209 secured to the bed 70. A pin 210 depends from the slide 206 through a slot in the lower block 208, and a spring 212 is extended between the pin 210 and an anchor pin 214 fixed in the stand 24. The spring 212 tends to retract the slide 206. A plate 216 is slidably mounted on a pair of studs 218 that are screw-threaded in the block 208 on either side of the cam 204. Coil springs 220 interposed between the plate 216 and nuts 222 on the studs 218 urge the plate 216 against the rear edge of the cam 204. The force of the spring 212 is sufficient to retract the slide 206 against the action of the springs 220 when the cam 204 is in its upper limiting position.

The wire W is led from a supply spool S, Fig. 1, across a wire guide 223 and passes downwardly through the sleeve 92, Fig. 16, the cylinder 142, Fig. 17, the tube 152, and through a sleeve 224, Figs. 9, 11, 15 and 16, disposed at the lower end of the spindle 126, thence passing between the slide 206 and a finger 226 formed on a plate 228 secured to the block 208. The sleeve 224 is received in suitable recesses afforded in the lower end of the spindle 126 and in a plate 230 secured thereto, and it extends through an aperture in a flanged cap 232 that is secured to the peripheral edge portion of the plate 230 by set screws 234. A set screw 236, Fig. 9, on the cap 232 serves to secure the sleeve 224 in the position shown.

Fig. 9 illustrates the positions of the various parts when the head 98 has decended for causing the end of the wire W to be embedded in the molding M, but before the bifurcated member 162, Figs. 9, 11 and 14, has completed its descent. Slidably mounted in the lower part of the spindle 126 is a small cam pin 238, Figs. 9, 15 and 19, the lower end of which cooperates with a beveled edge of a slide 240 mounted in a horizontal guideway formed by grooving the bottom face of the spindle 126. This guideway is lined by strips 242 of hardened steel to minimize wear of the parts. Attached to and depending from the slide 240 is a knife 244, shown in detail in Fig. 18, having a cutting edge adapted to form and sever the pins P from the wire W. A pair of pins 246 projects from the end of the slide 240 into a corresponding pair of sockets in the block 230, and coil springs 248 are disposed in these sockets tending to urge the slide 240 in such a direction as to retract the knife 244 from the wire W.

When the yoke 162 is depressed by the cams 176, Figs. 4 and 11, the ring 184 is pushed downwardly by the rods 178, causing the ball-bearing retaining ring 188 to bear upon the upper end of the pin 238, Fig. 9. As the pin 238 is forced downwardly, it cams the slide 240 to the right, as viewed in Figs. 9, 15 and 18, until the foremost cutting edge of the knife 244 has penetrated the wire W a distance substantially equal to the radius thereof. The spindle 156 is rotated continuously by the motor 138, Fig. 4, causing the knife 244 to turn around the wire W. A portion of the knife 244 is effective to form the outer end 250, Fig. 10 and 18, of a pin P at a given distance from the end of the wire W which has been embedded in the molding M. Preferably this end portion 250 is substantially conical and has a slightly rounded point as shown. Another part of the knife 244 forms an anchor portion 252 in the wire W immediately above the preceding pin point 250. In the next succeeding pin setting operation the portion 252 affords an anchor for the next pin that is cut from the wire W. The anchor portion 252 comprises a series of superposed frusto-conical sections terminating in a conically pointed end 254. The knife 244 also serves to divide the wire W intermediate the portions 250 and 252 formed in the wire as just described.

During the pin setting and forming operation the cam block 204, Figs. 11 and 13, is in its lower position causing the slide 206 to be urged against the wire W. The spring-pressed plate 216 yields to prevent binding of the cam 204. The wire W thus is clamped firmly between the slide 206 and the finger 226 immediately adjacent to the molding M. As is best shown in Fig. 6, the bed 70 has an inclined surface upon which the molding M rests so that the pin P is driven into the molding M at a slant relative thereto. The projecting end of the pin P inclines toward the outer edge of the molding M as shown in Fig. 3 to prevent any tendency of the impaled curtain or other fabric to slip off of the pin P when the molding M is in use.

To insure that the pins P are securely embedded in the molding M, a presser foot 256, Fig. 9, is secured to and depends from the slide block 100 to engage and press down upon the end of a pin P disposed thereunder. In the illustrated embodiment the foot 256 is located a distance equal to the spacing of three pins from the work station.

Figure 7:
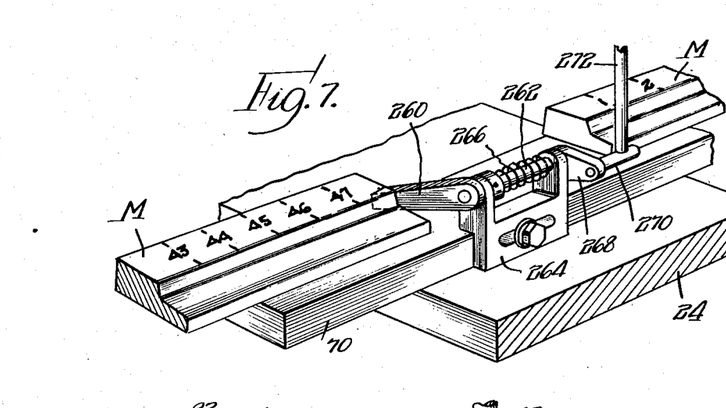
Fig. 7 is a fragmentary perspective view of a feed regulating device for properly timing the movement of the moldings.
Figure 8:
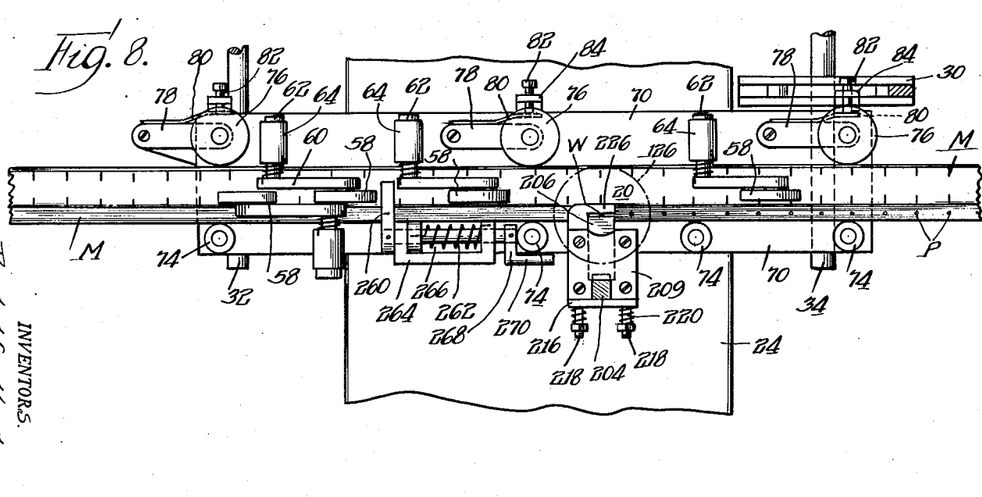
Fig. 8 is a horizontal section on the line 8—8 in Fig. 4.

It is desired that the pins P be affixed to the molding M in predetermined spaced positions which may have a definite relation to the indicia marked on the moldings. The moldings M usually are fed by hand into the machine by sliding them across the feed table 22. In order to properly time the introduction of each molding into the machine there is mounted on each feed bed 70 a stop finger 260, Figs. 4, 7 and 8, disposed a given distance in advance of the pin setting station 20. The finger 260 is fast on a shaft 262 journaled in a bracket 264 secured to the bed 70. A torsion spring 266 on the shaft 262 tends to urge the finger 260 downwardly against the bed 70 in position to arrest an incoming molding M. A crank 268 on the shaft 262 is provided with a pin 270 as vertically aligned with a rod 272, Figs. 4 and 7, depending from a bracket 274 on the head 98.

When the head 98 descends to effect a pin setting operation, the rod 272 engages a pin 270 to lift the stop finger 260. If the stop finger 260 has previously been effective to arrest a molding M, it now permits passage of the molding. As may be seen in Fig. 5, the spurs 56 on the feed chain 26 do not contact the molding M in advance of the stop finger 260 with sufficient force to cause any jamming or damage to the molding when the finger 260 is down. There is sufficient drag on the molding M, however, to start it moving toward the pin setting station when the finger 260 is raised and the chain 26 is in motion. The spurs 56 penetrate the molding after it passes the finger 260, thereby to grip the molding firmly. While a molding M is passing step by step through the work station, the stop finger 260 is alternately elevated and permitted to drop. When a molding M is passing beneath the finger 260, the finger merely rests lightly on the surface of the molding, but when the trailing end of the molding has passed the finger 260, the latter then drops onto the bed 70 to arrest the leading edge of a succeeding molding until the next depression of the work head 98. In this way, the leading end of each molding is spaced in a fixed amount from the first pin to be inserted in the molding.

To summarize the operation of the machine, insofar as each of the work stations 20, Figs. 1 and 2, is concerned, the molding M is fed successively in a longitudinal, step-by-step manner through the station. It may be assumed that the free end of the wire W initially has an anchor portion 252—254, Figs. 3, 10 and 18, formed thereon from a previous pin-cutting operation. The head 98 descends, causing the end of the wire W to be driven or pushed into the molding M from the obverse or curtain-engaging face thereof. The bifurcated member 162 then descends and causes the cutting knife 244 to be brought into operation, concurrently forming an outer end 250 of the pin P and the anchor portion 252—254 of the next succeeding pin, while severing the embedded pin P from the wire W. The member 162 is elevated to retract the knife 244 and the head 98 is raised to enable the feed pawl 144, Fig. 9, to make a fresh bite into the wire W, which is held stationary by the pawl 94 while the head 98 is being elevated. The presser foot 256 is brought into action each time the head 98 is depressed to insure secure anchorage of the pin P in the molding M. The completed moldings are deposited on the discharge table 25, Fig. 1, after passing through the work station.

It will be appreciated from the foregoing that we have provided a novel and useful machine for forming pins from a wire and inserting the pins in a row in a pierceable member such as a curtain stretcher molding. The pin setting apparatus described herein insures accurate placement and aligning of the pins. The operations are performed rapidly and efficiently, and the machine requires a minimum of attendance.

It is obvious that various changes may be made in the specific embodiment set forth for purposes of illustration without departing from the principles of the invention. The invention is accordingly not to be limited to the precise details disclosed herein but includes all modifications thereof within the spirit and scope of the appended claims.

The invention is hereby claimed as follows:

1. In a wire forming and setting machine, a wire feeding mechanism including a first movable member, means operating said wire feeding member cyclically for intermittently advancing the wire, a retractable rotary cutter mounted on said first movable member, a second movable member controlling said cutter, and means cyclically operating said second movable member in timed relation with said wire feeding means for disposing said cutter intermittently in wire cutting position.

2. A machine adapted to insert the end of a wire into pierceable material and to leave a predeterminedly shaped portion projecting outwardly therefrom, and comprising wire handling means to embed the end of the wire in the material, and severing means operable to sever the projecting portion of the embedded wire whereby to leave a partially embedded portion, and said severing means including multiple forming portions operable to impart the predetermined shape to the wire on opposite sides of the point of severance thereof.

3. A machine adapted to successively insert the end of a wire into pierceable material and to leave a plurality of spaced predeterminedly shaped portions projecting outwardly therefrom, and comprising means for advancing the material, wire handling means to embed the end of the wire in the material, and severing means operable to cut the projecting portion of each successive end of the embedded wire whereby to leave spaced partially embedded portions and said severing means including multiple forming portions operable to impart the predetermined shape to the wire on opposite sides of the point of severance thereof.

4. A machine adapted to insert the end of a wire into an elongated pierceable member and to leave a succession of portions projecting outwardly therefrom, comprising feeding means movable substantially along the longitudinal axis of said member to advance the same step by step through the machine, wire handling means to embed the end of the wire in said member during each interval when said member and said feeding means are at rest, and severing means to cut the projecting portion of the embedded wire to leave a succession of portions extending outwardly from the member.

5. In a machine for successively inserting the end of a wire in curtain stretcher moldings or the like, and cutting the inserted wire to leave a row of portions projecting therefrom, the provision of a wire setting station, feeding means traveling beneath said wire setting station to advance a molding step by step through the wire setting station, wire handling mechanism operable to embed the end of the wire in the molding during periods of rest between the step by step feeding thereof, and cutting means operable during such periods of rest to sever the projecting wire whereby to provide the molding with a plurality of spaced aligned portions projecting outwardly therefrom.

6. In a machine for successively inserting the end of a wire in curtain stretcher moldings or the like, and cutting the inserted wire to leave a row of portions projecting therefrom, the provision of a wire setting station, conveyor means engaging the underside of a molding to advance said molding step by step through the said wire setting station, wire handling mechanism operable to embed the end of the wire in the molding during periods of rest between the step by step feeding thereof, and cutting means operable during such periods of rest to sever the projecting wire whereby to provide the molding with a plurality of spaced aligned portions projecting outwardly therefrom.

7. In a machine for successively inserting the end of a wire in curtain stretcher moldings or the like, and cutting the inserted wire to leave a row of portions projecting therefrom, the provision of a wire setting station, feeding means traveling beneath said wire setting station to advance a molding step by step through the wire setting station, wire handling mechanism operable to embed the end of the wire in the molding during periods of rest between the step by step feeding thereof, and cutting means operable during such periods of rest to sever the wire, thus leaving spaced portions projecting from the molding and including means engageable with the wire on opposite sides of the point of severance to simultaneously shape the outer and inner ends of successive projecting portions.

8. A method of successively inserting the end of a wire in a pierceable member and cutting the wire to leave embedded portions projecting therefrom, which comprises embedding the end of the wire in said member, simultaneously forming the projecting portion of the wire without bending thereof to provide spaced deformed portions along the axial length thereof corresponding to the outer end of a partially embedded portion and the inner end of the next succeeding portion, and severing the wire between said deformed portions to leave a portion partially embedded in said member.

9. A method of successively inserting the end of a wire in a pierceable member and cutting the wire to leave embedded portions projecting therefrom, which comprises embedding the free end of the wire in said member, forming the outer end of the projecting portion of the embedded wire while simultaneously forming an adjacent anchor portion on the wire, severing the wire by dividing the same intermediate said outer end and the adjacent anchor portion to leave an embedded projecting portion, and advancing the pierceable member a predetermined distance following each wire severing operation to provide a row of embedded portions in the member.

10. A machine adapted to insert the end of a wire in a pierceable member and cut the wire to leave a projecting portion, comprising rotary cutter means effective to form an anchor section on the wire, reciprocatory means to embed the anchor section in the pierceable member, and said rotary cutter means including additional means to form the outer end section of the embedded wire.

11. A machine adapted to insert the end of a wire in a pierceable member and cut the wire to leave a projecting portion, comprising reciprocatory means to embed the wire in the pierceable member, rotary cutter means for cutting the wire and including a portion effective to form an anchor section on a wire and another portion to form the outer end section of the embedded portion, and operating means coordinating the operations of said reciprocatory means and said rotary cutter means.

12. In a machine for inserting the end of a wire in curtain stretcher moldings and the like and cutting the inserted wire to leave a portion projecting therefrom, feeding means to advance a molding longitudinally step by step through a wire setting station in the machine, wire handling mechanism including a first reciprocatory member operable in one stroke thereof to embed the end of a wire in the molding and having an idle reverse stroke, a rotary knife, a slidable member supporting said knife for movement transverse of the wire, and a second reciprocatory member operable in one stroke thereof to actuate said slidable member for bringing said knife into position to sever the wire at a given distance from the embedded end thereof to leave a projecting portion, said second reciprocatory member effecting withdrawal of the knife from the wire during the reverse stroke thereof.

13. In a machine for inserting the end of a wire in curtain stretcher moldings and the like and cutting the inserted wire to leave a portion projecting therefrom, feeding means to advance a molding longitudinally step by step through a wire setting station in the machine, wire handling mechanism including a first reciprocatory member intermittently operative to embed the end of a wire in the molding, a rotary member mounted on said first reciprocatory member, driving means to rotate said rotary member, a slide on said rotary member capable of movement transverse of the wire, a slide-actuating member carried by said rotary member, a knife mounted on said slide, and a second reciprocatory member intermittently operative to produce relative movement between said slide-actuating member and said first reciprocatory member thereby to advance said knife into engagement with the wire to effect a severing operation leaving a partially embedded portion.

14. In a machine for inserting the end of a wire in curtain stretcher moldings and the like and cutting the inserted wire to leave a portion projecting therefrom, feeding means to advance a molding longitudinally step by step through a wire setting station in the machine, wire handling mechanism including a reciprocatory head operative in each forward stroke thereof to embed the end of a wire in the molding while the molding is at rest, a rotary spindle mounted on said head and having an axial wire feed passage therein, driving means to rotate said spindle, anti-friction means between said head and said spindle, said anti-friction means being movable axially relative to said spindle, a radially movable slide on said spindle, a wire forming and cutting knife carried by said slide, a slidable cam member carried by said spindle capable of movement parallel to the axis thereof, said cam member being operable by said anti-friction means and having a cam surface adapted to cooperate with said radial slide, and a reciprocatory member capable of movement in the same direction as but relative to said head, said reciprocatory member being connected to said anti-friction means whereby said cam member periodically is actuated to bring said knife into forming and cutting engagement with the wire to leave a partially embedded portion.

15. In a machine for inserting the end of a wire in curtain stretcher moldings and the like and cutting the inserted wire to leave a portion projecting therefrom, intermittently operating feed means to advance a molding step by step through a wire setting station in the machine, wire handling mechanism at said station comprising a reciprocable head having a cam follower thereon, first cam means for operating said head, a feed pawl on said head effective during each forward stroke of the head to advance the wire and embed a free end of the wire in the molding during an interval when the molding is at rest, a spindle journaled in said head and having a central wire channel extending axially therethrough, means to rotate said spindle, a knife, a movable member supporting said knife and carried by said spindle, a reciprocatory knife-operating device to effect intermittent advance and retraction of said knife relative to the wire, and second cam means controlling said knife-actuating device to advance said knife into engagement with the wire for severing the wire in timed relation with the insertion thereof in the molding whereby to leave a partially embedded portion.

16. In a machine for inserting the end of a wire in curtain stretcher moldings and the like and cutting the inserted wire to leave a portion projecting therefrom, intermittently operating feed means to advance a molding step by step through a wire setting station in the machine, wire handling mechanism at said station comprising a reciprocable head having a cam follower thereon, first cam means for operating said head, a feed pawl on said head effective during each forward stroke of the head to advance the wire and embed a free end of the wire in the molding during an interval when the molding is at rest, a stationary pawl to prevent reverse travel of the wire, a spindle journaled in said head and having a central wire channel extending axially therethrough, means to rotate said spindle, a wire forming and cutting knife, a slide member supporting said knife and carried by said spindle, a reciprocatory device cooperating with said slide member to effect intermittent advance and retraction of said knife relative to the wire, and second cam means controlling said reciprocatory device to advance said knife into engagement with the wire for severing the wire in timed relation with the insertion thereof in the molding whereby to leave a partially embedded portion.

17. In a machine for inserting the end of a wire in curtain stretcher moldings and the like and cutting the wire to leave a projecting portion, feeding means engaging and adapted to advance the moldings successively through a wire setting station in the machine, cyclically operating wire forming and setting apparatus at said station, a retractable stop finger to arrest the leading edge of each molding in advance of the wire setting station and while engaged by said feeding means, and stop finger operating means actuated by said apparatus to effect retraction of said stop finger in timed relation with the operation of said apparatus.

RUDOLF KRAH.
WALTER W. BLOCK.

REFERENCES CITED

The following references are of record in the file of this patent:

UNITED STATES PATENTS

| Number | Name | Date |
|---|---|---|
| 822,867 | Preston | June 5, 1906 |
| 1,140,228 | Wright | May 18, 1915 |
| 1,174,937 | Merrick | Mar. 7, 1916 |
| 1,562,547 | Farley | Nov. 14, 1945 |
| 2,381,985 | Robinson | Aug. 14, 1945 |
| 2,421,474 | Alters | June 3, 1947 |